A. F. STUELKE.
DATE HOOK.
APPLICATION FILED MAY 1, 1912.

1,070,303.

Patented Aug. 12, 1913.

Witnesses.
S. B. Haite
W. A. Smith

Inventor.
Arthur F. Stuelke.

UNITED STATES PATENT OFFICE.

ARTHUR F. STUELKE, OF NASHUA, IOWA.

DATE-HOOK.

1,070,303.　　　　Specification of Letters Patent.　　Patented Aug. 12, 1913.

Application filed May 1, 1912.　Serial No. 694,588.

*To all whom it may concern:*

Be it known that I, ARTHUR F. STUELKE, a citizen of the United States, residing at Nashua, in the county of Chickasaw and State of Iowa, have invented a new and useful Date-Hook, of which the following is a specification.

This invention relates to date hooks and is designed primarily for use in dislodging fruits and the like which are packed in a pressed state and are ordinarily difficult to separate for the purpose of dispensing or weighing the same, the said invention being particularly useful in connection with the removal of dried fruits from the containers or packages in which they are received by the retailer.

An object of this invention is to provide a date hook which may have a series of tines, novel means being provided for removing material which may adhere to the tines during the manipulation of the implement, the said invention furthermore being provided with novel means for returning the removing device to its normal position for a repetition of the operation.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
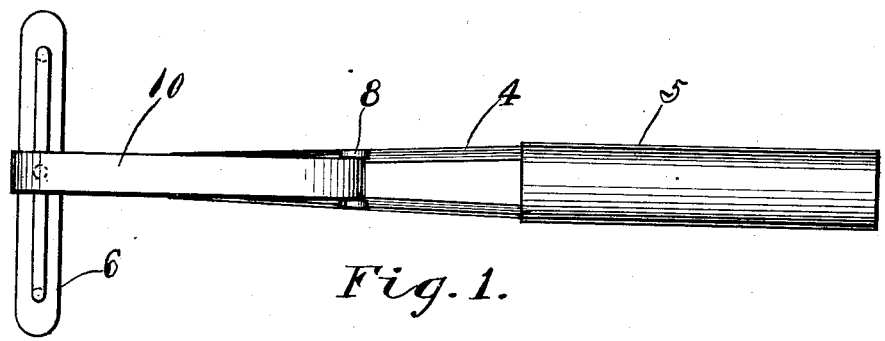
Figure 2:
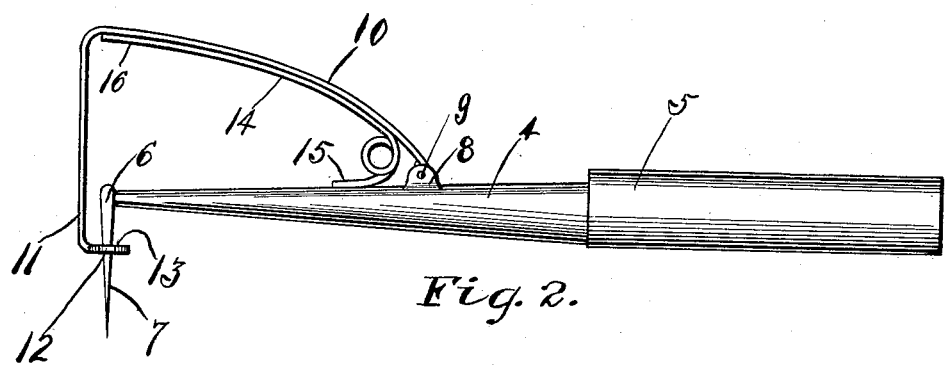
Figure 3:
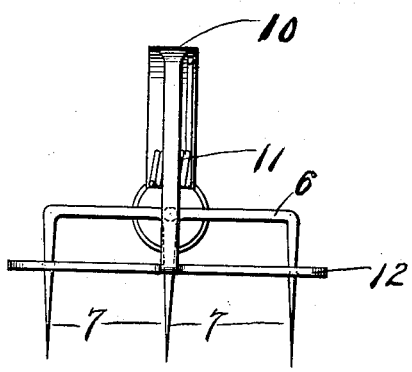

Figure 1 illustrates a top plan view of the date hook embodying the invention; Fig. 2 illustrates a side elevation thereof; and Fig. 3 illustrates an end view.

In these drawings 4 denotes a shank which is of any appropriate type provided with a suitable handle 5. The shank terminates in a head 6 having a series of tines thereon, the said tines preferably standing at approximately right angles to the length of the shank.

The shank has ears 8 apertured to receive a pivot pin or pintle 9, on which an arm 10 is mounted, the said arm 10 extending upwardly and longitudinally of the shank 4 and terminating in a portion 11 extending past the end of the shank 4, the said depending portion 11 having an integral displacing bar 12, the said displacing bar having apertures 13 for the reception of the tines 7.

The arm 10 is held normally in its elevated position through the medium of a spring 14, which has one end 15 anchored to the shank 4 and another end 16 lying parallel with the under surface of the arm 10 and engaging said arm 10.

In the manipulation of the implement, the tines are embedded or forced into a mass of compact fruit such as dates, dried peaches, apples, and the like and as experience will show, the said fruit will, to a certain extent, adhere to the tines. In order to dislodge so much of the fruit as has adhered to the tines, pressure on the arm 10 will cause the displacing bar 12 to move longitudinally of the tines, thus engaging any material that has adhered to the tines and carrying it clear of the ends of said tines. When pressure is removed from the arm 10, the spring 14 will operate to elevate the arm with relation to the shank 4, thereby returning the displacing bar to its normal position for a repetition of the operation. It will be understood from an inspection of Fig. 2 that the displacing bar is free to move to the extreme inner ends of the tines where they join the head in order that the full lengths of the tines may be forced into the mass of material being dislodged or separated.

I claim

1. A date hook comprising a shank portion, tines extending at right angles to the shank, apertured ears integral with the upper edge of the shank, a displacing arm having one end thereof pivotally held between the ears, said arm having loop portions on one end thereof, said loop portions adapted to receive the respective tines and means for returning the displacing arm to its normal position.

2. A date hook comprising a shank portion, tines extending at right angles to the shank, means integral with the upper edge of the shank for pivotally securing a displacing arm thereto, means on one end of the displacing arm for receiving the respective tines, a spring member having one end thereof anchored to the shank portion, the opposite end of the spring adapted to engage the under side of the displacing arm, the said spring having a loop portion intermediate its length for tensioning the spring for returning the displacing arm to its normal position.

ARTHUR F. STUELKE.

Witnesses:
S. B. WAITE,
W. A. SMITH.

Copies of this patent may be obtained for five cents each, by addressing the "Commissioner of Patents, Washington, D. C."